Patented June 16, 1936

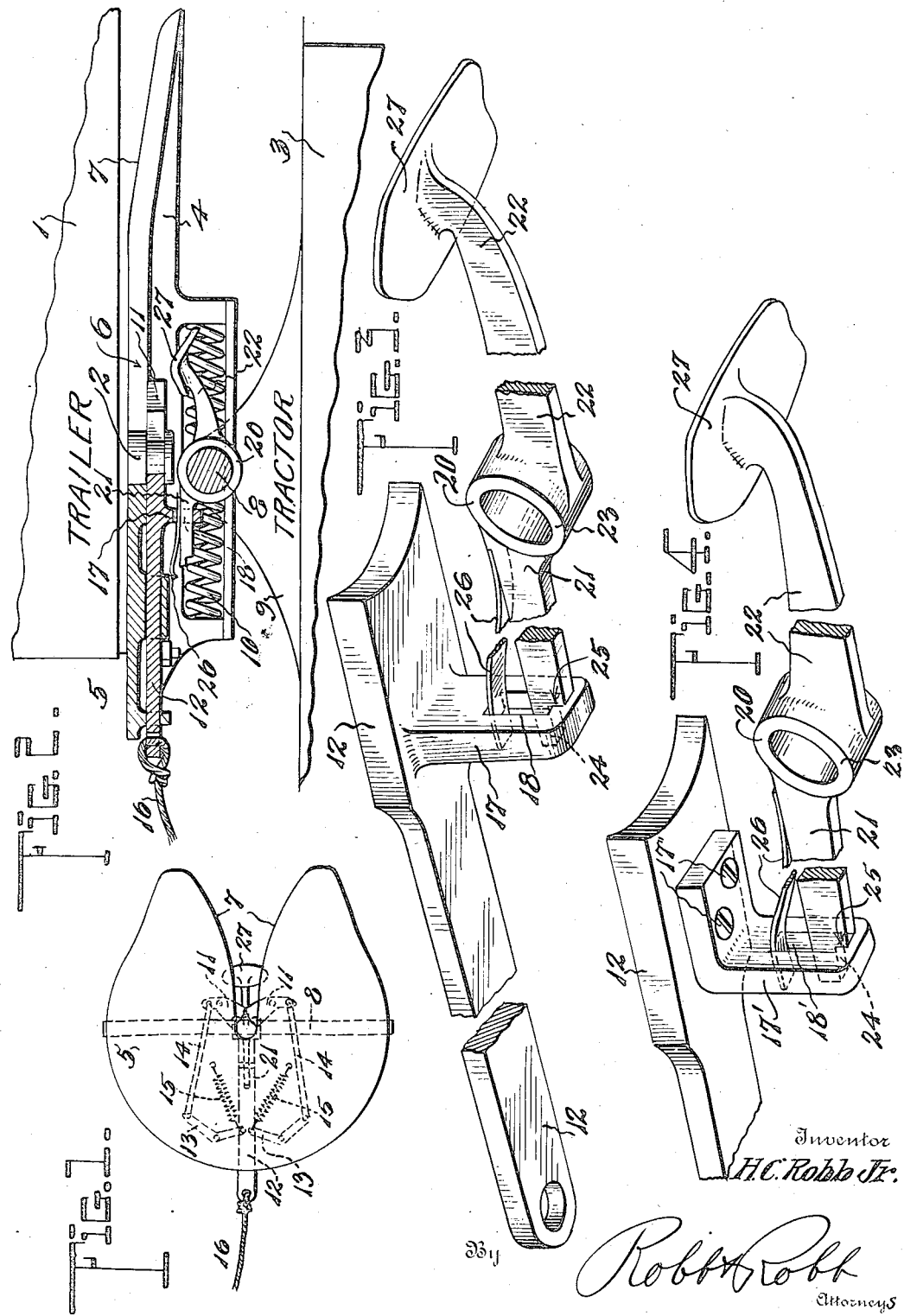

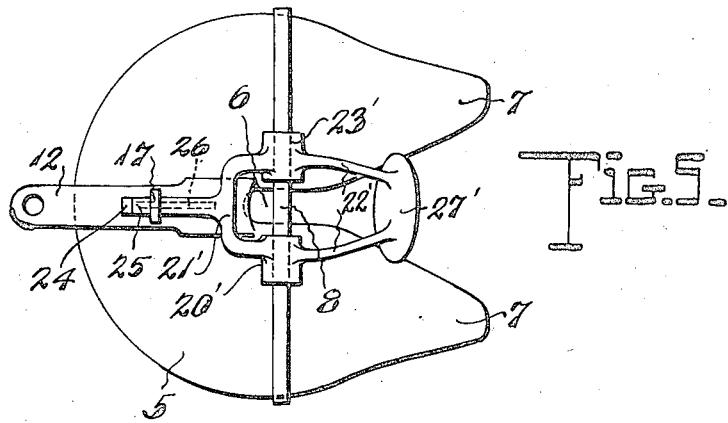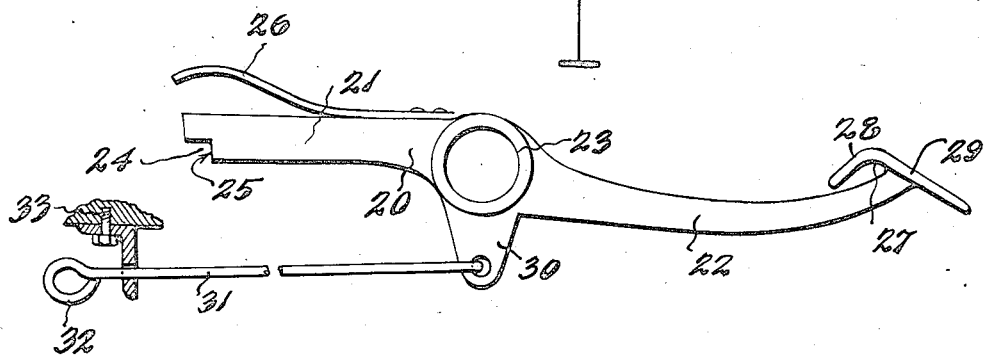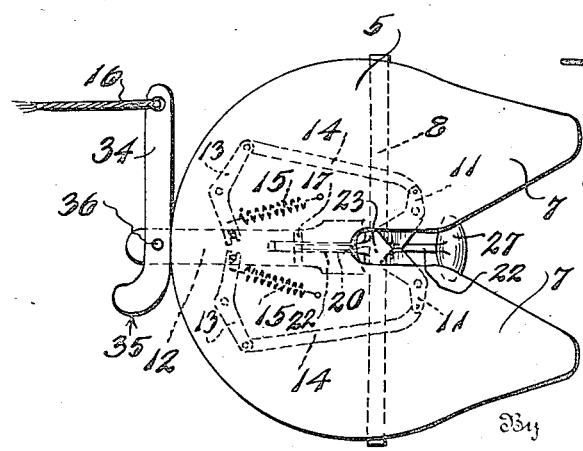

2,044,227

UNITED STATES PATENT OFFICE 2,044,227

LOCK CONTROL FOR FIFTH WHEEL COUPLINGS AND THE LIKE

Harry C. Robb, Jr., Syracuse, N. Y., assignor to Highway Trailer Company, Edgerton, Wis., a corporation Application September 25, 1935, Serial No. 42,115

19 Claims. (Cl. 280—33.1)

My invention appertains to draft coupling devices for coupling together vehicles such as a tractor and a semi-trailer for combined operation as a unit. Such couplings customarily embody a male coupling part mounted on one vehicle and a female coupling part mounted on the other vehicle for receiving the male part, the female part including locking means for releasably locking the coupling parts together so as to prevent relative horizontal and vertical movement therebetween. More particularly, my invention concerns an improved control for such locking means.

As an example of a tractor-trailer coupling device which is in extensive use today, and to which my invention is particularly adapted, I refer to the Martin and Farr Patent, No. 1,412,025, granted April 4, 1922. That invention gave to the trailer industry what is now commonly known as the automatic split fifth wheel.

As a later development, the invention of the Hathorn Patent No. 1,982,914, granted December 4, 1934, provided for the temporary latching open of the locking jaws of the Martin fifth wheel, following an initial pull on the control rope or cable, the open-jaw condition being maintained until the uncoupling of the vehicles has been substantially completed, whereupon the locking jaws are tripped shut automatically. The present invention achieves the same general results of the Hathorn invention, but in a novel and distinctively different manner.

While the invention is illustrated and particularly described herein in association with that type of fifth wheel construction as embodied in the patents specifically mentioned above, it is to be understood that it is not limited or confined to use with this particular type, as the same principles and ideas may be applied to other types, several of which are also in use, but perhaps not so extensively. In adapting my invention to these other types of fifth wheels, it may be necessary to modify or vary slightly the specific details of construction of the latch control for the king pin locking member, but such changes will become obvious to those skilled in this art as the description of the forms disclosed herein by way of example, proceeds.

In its broad aspect, my invention contemplates the provision of a latch or other suitable holding means for temporarily retaining the jaws, dogs, bolt or lock, as the case may be, of the female coupling part, in a withdrawn, open, inoperative, or king pin releasing position for a predetermined interval during uncoupling of a tractor from its trailer, the latch or holding means being automatically rendered inoperative by the relative longitudinal movement of the vehicles in uncoupling, so as to condition the female coupling part for subsequent coupling action.

A further object of the invention is to provide a control means for the female coupling means, which control means may be initially operated manually to release the male coupling part or king pin and hold the jaws in such released position for a predetermined interval of the uncoupling action, said control means being further operable automatically to close the jaws under the control of the king pin position relatively to the mating female coupling, whereby to condition the jaws for subsequent coupling of the vehicles in the usual manner.

Another object of the invention is to provide a latch device for temporarily holding open the lock of the female coupling, which latch device includes a part which is disposed in the path of the male or king pin coupling when operative to hold the jaws open, so as to be actuated by the king pin incident to a predetermined relative movement between the king pin and the female coupling during uncoupling action, whereby to trip the latch device and render the same inoperative.

A still further object of the invention is to provide for the attainment of the above mentioned ends by a simple and effective device in the nature of an attachment which may be applied to the present commercial forms of fifth wheel units without necessitating any modification of the fifth wheel design whatsoever, or with at least no more than a very few minor changes.

Other and further objects and advantages will be hereinafter described, and the novel features thereof defined by the appended claims.

In the drawings:

Fig. 1 is a top plan view of a well-known type of fifth wheel, and showing my invention adapted thereto;

Fig. 2 is a sectional view taken longitudinally through the fifth wheel of Fig. 1, the view further illustrating the mounting of the fifth wheel on the tractor and the cooperating king pin on the trailer, these latter parts being shown in elevation;

Fig. 3 is a detail perspective view of one form of my improved king pin lock operating and control means;

Fig. 4 is a view generally similar to Fig. 3, illustrating a slightly modified construction;

Fig. 5 is a bottom plan view of a lower fifth wheel embodying another modified form of king pin lock operating and control means;

Fig. 6 is a side elevation of a latch lever, generally similar to that illustrated in Figs. 2 to 4, inclusive, the same being modified so as to provide a manually operable trip means for the same; and Fig. 7 is a plan view generally similar to Fig. 1, showing my invention as incorporated in a different form of king pin lock operating mechanism.

Like reference characters designate corresponding parts in the several figures of the drawings.

Referring first to Figs. 1 to 3, I designates generally a semi-trailer having a king pin 2 mounted beneath the front end thereof in the usual manner, for cooperation with a fifth wheel mounted on the rear portion of a tractor vehicle 3. As illustrated in these figures, the lower or tractor fifth wheel, generally designated 4, is of the Martin type, including a generally circular plate 5, having a radial slot 6, and the usual apron or ramp 7. The plate 5 is mounted for rocking movement on a cross-shaft 8, and is fixed to the bed of the tractor in the usual manner by the bolsters 9. The usual cushioning springs 10 permit relative movement of the lower fifth wheel on its mounting in a manner which is now well-known.

Associated with the slot 6, are the locking jaws or dogs 11, which are pivotally mounted on the fifth wheel so that they may be projected across the slot 6 or retracted from the slot. The locking members are actuated by the operating bar 12, which is mounted for radial shifting movement and operatively connected to the jaws by levers 13 and links 14. The springs 15 bias the jaws normally to closed or locking position. Shifting of the operating bar 12 may be effected through means of a rope 16, fastened to the outer end thereof and extending to the tractor cab (not shown). As described so far, the parts are conventional and well-known.

In adapting my invention to a fifth wheel construction such as has been described above, I provide a lug 17, which may be rigidly mounted on the operating bar, as by welding, or in any other suitable manner. If desired, this lug may be formed integral with the operating bar in the original production of the bar; or instead of a lug, a bracket 17' may be fastened to the operating bar, as by machine screws or bolts 17''. The lug 17 or bracket 17' is provided with an opening 18 or 18' extending therethrough for cooperation with a latching lever generally designated by the reference character 20. This latching lever includes oppositely extending arms 21 and 22, projecting at opposite sides of a sleeve or bearing 23, for rockably mounting the lever 20 below the fifth wheel at any convenient point, as for example, on the cross-shaft 8. Lever arm 21 projects loosely through the opening 18 or 18', and is provided with a recess or notch 24, forming an abutment shoulder 25 adjacent the outer end of the arm. A spring 26, preferably having the form of a leaf spring, is suitably fixed to the upper surface of the arm 21, and also projects through the opening 18 or 18' in the lug 17 or the bracket 17', as the case may be, so as to normally urge the lever 20 in a direction such that the arm 21 is always forced towards the bottom of the opening 18 or 18'. The point at which the lug 17 or the bracket 17' is fastened to the operating bar 12 is important, and the same is chosen so that it bears a definite relation to the length of the arm 21 and the location of the abutment shoulder 25. By way of further explanation of this relation, it will become apparent, for reasons which will be hereinafter more fully explained, that it is not desired to effect a latching open of the jaws, except at the beginning of the uncoupling operations in uncoupling the tractor from the trailer. Thus, I propose to arrange the lug 17 or bracket 17' in such relation to the lever arm 21 and abutment shoulder 25, that it is necessary to first shift the operating bar 12 radially outwardly a distance slightly greater than that necessary to just clear the locking jaws 11 from the fifth wheel slot 6, before the jaws become latched open by engagement of the abutment shoulder 25 behind the lug 17 or bracket 17'. By this arrangement, latching open of the jaws during coupling of the tractor with the trailer is prevented, and the latch becomes operative only when the operating bar 12 is manually operated to initially condition the locking jaws for uncoupling operation.

Lever arm 22 is so formed at its outer extremity as to provide oppositely inclined cam surfaces. Preferably, the arm 22 is broadened at its outer end or provided with a plate-like portion 27. The oppositely inclined cam surfaces are designated 28 and 29. The inclined cam surface 28 is so arranged that when the lever 20 is rocked on its mounting to effect a latching engagement of the abutment shoulder 25 behind the lug 17 or bracket 17', this cam surface will be disposed in the path of movement of the king pin 2 as it passes out of the fifth wheel slot 6 during the uncoupling operation. Thus, in uncoupling the tractor from the trailer, the lower end of the king pin will strike the cam surface 28 and depress the lever arm 22, causing a corresponding elevation of the lever arm 21, resulting in release of the abutment shoulder 25 from abutting engagement with the lug or bracket, and thereby permit the restoration of the operating bar and the locking jaws to their normal closed jaw positions.

In the event that the operating bar 12 is shifted so that the locking jaws become latched open while the tractor is uncoupled from the trailer, the latch will be automatically released by an initial engagement of the trailer king pin with the cam surface 29 during coupling of the tractor and trailer together, as should be obvious. Of course, in such a case, the lever 20 might be manually released by pressing on the lever arm 22 or cam plate 20 by means of a stick, bar, or even directly by hand, whereby the locking jaws 11 will be tripped shut before the coupling operation commences. It is to be understood that one of the characteristic features of the Martin type of fifth wheel is that the locking jaws are preferably closed at all times, except during passage of the king pin between the jaws.

In Fig. 6, I have shown a modified latching lever construction wherein the lever is provided with a manual trip device which may include an arm 30 rigidly mounted on or integrally formed with the lever, and to which a trip rod 31 is fastened, the trip rod being extended to an accessible position, as at the outer edge of the fifth wheel. The trip rod may be provided with an operating handle 32, and the rod supported in any suitable manner, as by a bracket 33 fastened adjacent the edge of the fifth wheel.

Referring to Fig. 5, I have shown a modified form of trip lever 20', the arms 21' and 22' of which are in the form of a yoke, so as to leave a substantial clearance between the lower extremity of the king pin and the cross-shaft 8, where this clearance is not sufficient to permit the positioning of the bearing member 23 of Figs. 1 to 4, inclusive, directly beneath the slot 6. Thus, in the Fig. 5 construction, the lever bearing or collar is divided, as at 23', so as to be disposed on opposite sides of the fifth wheel slot, and leaving the space between the lower end of the king pin and the cross-shaft 8 clear. As in the case of the lever 20 of Figs. 1 to 4, the arms 22' of the Fig. 5 lever form are provided with a cam plate 27', having oppositely inclined cam surfaces similar to the cam surfaces 28 and 29 of Figs. 1 to 4.

It will be obvious from the foregoing description that the number of parts which make up the latch construction are very few, and that the same may be applied to the present commercial form of fifth wheel without any modification of the fifth wheel structure. Each of the lever constructions disclosed herein may be in the form of a simple casting, and consequently, the lever and lug attachment involves only a slight expense, which is more or less inconsequential when the beneficial advantages derived therefrom are considered. It is conceivable that the spring 26 might be omitted entirely by counter-weighting the lever 20 or 20' so that it normally is urged towards latching position by its own weight. In practice, however, the spring or the equivalent thereof, is preferably used to insure positive operation of the latch.

The use of a cam lever as disclosed in the Hathorn patent hereinbefore referred to, for actuating the operating bar 12, affords certain leverage advantages whereby the shifting of the operating bar requires less manual effort than where the rope or cable 16 is connected directly to the operating bar, as shown herein in Figs. 1 and 2. It therefore may be desirable to retain this cam lever in practicing the invention disclosed herein in such a case, the tripping of the Hathorn cam lever may be carried out by suitably connecting the trip device with a depressible cam lever generally similar to the lever 22 of Figs. 1 to 4, or the lever 22' of Fig. 5, disclosed herein. Such a connection should be obvious to those skilled in this art in view of the present disclosure. It will be understood that in such a case the latch arm and lug would be unnecessary. On the other hand, the advantages of the Hathorn cam lever may be secured by supplementing the latch construction of Figs. 1 to 6 herein, with a cam lever 34 as shown in Fig. 7. It is intended that this cam lever 34 shall be of such construction that the cam face 35 engages the edge of the fifth wheel so as to shift the operating bar radially outwardly by pivotal movement of the lever 34 about its pivotal connection as in the Hathorn construction, but with a modification of the cam face 35, so that the operating bar will be shifted to position in which the locking jaws become latched open before the cam lever 34 becomes aligned with the operating bar. In other words, lever 34 does not automatically hold itself in operated position, as in the case of the Hathorn cam lever, under which condition the cam lever will automatically return to its normal or inoperative position incident to release of the latch device associated with the operating bar, as previously described.

Summarizing the operation of my invention, and assuming that the tractor is coupled to the trailer, when it is desired to uncouple the tractor from the trailer, the rope 16 is pulled in the usual manner, thereby drawing the slide-bar 12 radially outwardly. As the operating bar shifts outwardly, the lugs 17 or bracket 17' moves relatively to the latch arm 21 and until the lug or bracket engages in the recess 24, which engagement is effected by a rocking motion of the lever 20 under the influence of the spring 26. As hereinbefore mentioned, this latching engagement does not take place until the locking jaws have been spread apart for a distance slightly greater than the width of the fifth wheel slot 6. When the lever 20 assumes a latching position respecting the lug or bracket, the cam surface 28 is projected for engagement with the lower extremity of the trailer king pin as it moves outwardly through the fifth wheel slot during uncoupling operation. When the jaws have been temporarily latched open as above described, the tractor is driven forward, and when the king pin strikes the cam surface 28, the latching lever arm 22 will be depressed, and the arm 21 correspondingly elevated, thereby disengaging the recess 24 from the lug 17 or bracket 17'. When the latch is thus released, the locking jaws will return automatically to their closed position under the influence of the usual springs 15. After the uncoupling has been completely effected, the tractor may be coupled to the same or another trailer by backing under the front end thereof, during which motion the trailer king pin will be guided into the fifth wheel slot 6 in the usual manner. As the locking jaws engage the king pin during the coupling action, they are automatically spread apart in the usual manner, but since they cannot be spread by the king pin to any extent greater than the width of the king pin or the width of the slot 6, the spreading motion is not sufficient to shift the operating bar 12 outwardly a distance sufficiently great to enable the latching lever 20 to automatically effect latching engagement of the lug or bracket with the recessed lever arm. Other means may be availed of to prevent the jaws from becoming latched open during the coupling action. Another simple expedient for this purpose is to provide a loose or lost motion connection in the linkage which operatively connects the operating bar with the locking jaws, whereby the locking jaws may be operated by the operating bar, but the operating bar will not correspondingly operate when the locking jaws are spread apart by the king pin during coupling.

In the construction illustrated in Fig. 7, the operation of the latch is essentially the same as just described. In this case, however, the operating bar is shifted by the cam lever 34 in a manner generally similar to the invention of the Hathorn patent, with the difference that, as shown in Fig. 7, the cam lever 34 does not move so far as to assume an aligned position with respect to the operating bar, and consequently, it will automatically return to its inoperative or released position incident to release of the latching device associated with the operating bar, as disclosed in Figs. 1 to 6.

While the details of construction have been herein shown and described, the invention is not confined thereto, as changes and alterations may be made without departing from the spirit thereof as defined by the appended claims.

Having thus described my invention, what I claim as new and desire to secure by Letters Patent, is—

1. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of means for positively holding said locking member in a position permitting uncoupling of the female coupling from a mated king pin, and means operable by the king pin for releasing said holding means incident to a predetermined relative uncoupling movement between said female coupling and king pin, whereby to restore the locking member to its normal position aforesaid.

2. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of means for positively holding said locking member in a position permitting uncoupling of the female coupling from a mated king pin, and means for releasing said holding means incident to a predetermined relative longitudinal movement in either direction between said female coupling and king pin, whereby to restore the locking member to its normal position aforesaid.

3. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of means for positively holding said locking member in a position permitting movement of a king pin through said slot in uncoupling of the female coupling from a mated king pin, and means operable directly by a predetermined relative movement of the king pin respecting the slot whereby to automatically render said holding means ineffective and thereby restore the locking member to its normal position aforesaid.

4. The combination with a female draft coupling assembly for use in coupling tractor and semi-trailer vehicles for combined operation, said assembly including a king pin receiving slot, a movable locking member associated with said slot and normally projecting across the slot to form therewith a king pin socket into which the king pin is permitted to pass, but not out of the socket, and means for actuating said locking member, of means for positively holding said locking member in a position permitting uncoupling of the female coupling from a mated king pin, and means disposed in the path of movement of the king pin for releasing said holding means incident to a predetermined relative movement between said female coupling and king pin, whereby to restore the locking member to its normal position aforesaid.

5. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of means for positively holding said locking member in a position permitting uncoupling of the female coupling from a mated king pin, and means actuatable by said king pin for releasing said holding means incident to a predetermined relative uncoupling movement between said female coupling and king pin, whereby to restore the locking member to its normal position aforesaid.

6. The combination with a female draft coupling assembly for use in coupling tractor and semi-trailer vehicles for combined operation, said assembly including a king pin receiving slot, closed at one end, a movable locking member associated with said slot and normally projecting across the slot intermediate the ends of the latter to form, with the closed end a king pin socket, and means for actuating said locking member, of means for positively holding said locking member in a position leaving the slot unobstructed intermediate its ends, and means operable incident to passage of the king pin through the slot and while the king pin is spaced from the closed end of the slot, but still intermediate the ends of the slot, for releasing said holding means, whereby to restore the locking member to its normal position aforesaid.

7. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of means for positively holding said locking member in a position permitting uncoupling of the female coupling from a mated king pin, and cam means disposed in the path of the king pin for releasing said holding means incident to a predetermined relative movement between said female coupling and king pin, whereby to restore the locking member to its normal position aforesaid.

8. The combination with a female draft coupling assembly for use in coupling tractor and semi-trailer vehicles for combined operation, said assembly including a king pin receiving slot, a movable locking member associated with said slot and normally projecting across the slot to form therewith a king pin socket, and means for actuating said locking member, of a lever pivotally mounted adjacent said locking member actuating means and interengageable therewith incident to actuation of said actuating means to open said locking member and permit passing of the king pin out of said slot, said interengagement of the pivotal lever with the actuating means temporarily preventing closing of said locking member, and means for pivotally moving said lever incident to a predetermined movement of the king pin through the slot, whereby to disengage the pivotal lever from the locking member actuating means and restore the locking member to its normal position aforesaid.

9. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, abutment means on the operating bar, a lever rockably mounted adjacent the operating bar and coacting with the abutment so as to automatically interlock therewith when the operating bar is radially shifted to open said locking jaws, and means for rocking said lever out of engagement with the operating bar abutment incident to uncoupling of the fifth wheel and king pin.

10. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, abutment means on the operating bar, a lever rockably mounted adjacent the operating bar and coacting with the abutment so as to automatically interlock therewith when the operating bar is radially shifted to open said locking jaws, and means for rocking said lever out of engagement with the operating bar abutment incident to uncoupling of the fifth wheel and king pin, said last mentioned means comprising a second lever coacting with said first-mentioned lever, said second lever having a cam surface normally disposed out of, but projectable into the path of, the king pin when the locking jaws are opened, whereby relative uncoupling movement of the fifth wheel and king pin will effect engagement of said cam surface with the king pin and impart a rocking motion to said first-mentioned lever.

11. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, abutment means on the operating bar, a lever rockably mounted adjacent the operating bar, said lever including oppositely extending arms, one of which arms is adapted to engage said operating bar abutment when the operating bar is radially shifted to open said locking jaws and retain said operating bar in such shifted position, and the other of which arms extends so that its free end is normally disposed out of, but is automatically disposed in the path of, the king pin when the locking jaws are opened, whereby relative uncoupling movement of the fifth wheel and king pin effects engagement of said latter arm with the king pin and imparts a rocking motion to said lever arm to release the first-mentioned lever arm from the operating bar abutment, thereby restoring the operating bar and locking jaws to their aforementioned normal positions.

12. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, a lug rigidly mounted on and depending below the operating bar, said lug having an opening therethrough, the axis of which is substantially parallel to and below the plane of the operating bar, a lever rockably mounted below the fifth wheel for rocking movement in a vertical plane, said lever including oppositely extending arms, one on each side of the rocking axis, one of said arms projecting through the lug opening so that the lug is freely slidable thereon incident to shifting movement of said operating bar, and said arm having a recess forming an abutment shoulder adjacent the free end thereof, spring means for normally urging said arm downwardly in said lug opening for effecting a rocking movement of the lever in one direction to establish latching engagement of the abutment shoulder behind the lug when the operating bar approaches the end of its shifting movement in opening the jaws, and the other of said lever arms having an inclined cam surface normally disposed out of, but adapted to be projected by the aforementioned rocking movement of the lever, into the path of movement of the king pin in passing through the fifth wheel slot during uncoupling of the fifth wheel from the king pin, whereby said king pin is caused to depress the cam arm and rock the lever in the opposite direction, releasing the abutment shoulder of the other lever arm from latching engagement with the lug.

13. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, a lug rigidly mounted on and depending below the operating bar, said lug having an opening therethrough, the axis of which is substantially parallel to and below the plane of the operating bar, a lever rockably mounted below the fifth wheel for rocking movement in a vertical plane, said lever including oppositely extending arms, one on each side of the rocking axis, one of said arms projecting through the lug opening so that the lug is freely slidable thereon incident to shifting movement of said operating bar, and said arm having a recess forming an abutment shoulder adjacent the free end thereof, spring means for normally urging said arm downwardly in said lug opening for effecting a rocking movement of the lever in one direction to establish latching engagement of the abutment shoulder behind the lug when the operating bar approaches the end of its shifting movement in opening the jaws, the other of said lever arms having an inclined face normally disposed out of, but adapted to be projected by the aforementioned rocking movement of the lever, into the path of movement of the king pin in passing through the fifth wheel slot during uncoupling of the fifth wheel from the king pin, whereby said king pin is caused to depress the second mentioned lever arm and rock the lever in the opposite direction, releasing the abutment shoulder of the other lever arm from latching engagement with the lug, and said second mentioned lever arm having a second and oppositely inclined cam surface adapted to be engaged by the king pin during coupling of the king pin with the fifth wheel, whereby to trip the locking jaws closed should the same be open at the beginning of the coupling operation.

14. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, a latching lever rockably mounted beneath said fifth wheel and having one arm disposed for latching engagement with the operating bar when the operating bar is shifted to open jaw position, means for automatically rocking said latching lever in one direction to effect such latching engagement as aforesaid, and means operable by engagement with a king pin during uncoupling, and forming an integral part of said latching lever, for rocking said latching lever in the opposite direction so as to release the operating bar.

15. In combination with a female fifth wheel assembly including a king pin receiving slot, locking jaws working therein, a radially shiftable operating bar operatively connected with said locking jaws, and means normally urging said operating bar and locking jaws into positions which they assume when a king pin is coupled with the fifth wheel, a latching lever rockably mounted beneath said fifth wheel and having one arm disposed for latching engagement with the operating bar when the operating bar is shifted to open jaw position, means for automatically rocking said latching lever in one direction to effect such latching engagement as aforesaid, and means operable by engagement with a king pin during uncoupling, and forming an integral part of said latching lever, for rocking said latching lever in the opposite direction so as to release the operating bar, said latter means comprising a second arm having an inclined cam surface adapted to coact with the lower end of the king pin.

16. An attachment for fifth wheel units of the class described having a locking jaw operating bar, comprising a lug adapted to be rigidly mounted on the operating bar, said lug having an opening therethrough, a lever having provision for rockably mounting the same beneath the fifth wheel, said lever including an arm loosely extending through the lug opening and having a recess forming an abutment shoulder adjacent the free end of the arm for latching engagement behind the lug when the operating bar is shifted to jaw opening position, and a second arm extending oppositely to the first-mentioned arm and provided with an inclined cam surface adjacent its free end adapted to be projected into the path of movement of the king pin when the shoulder of the first-mentioned arm is in latching engagement behind the operating bar lug, whereby the cam arm will be depressed by the king pin and release the latch arm incident to relative movement between the king pin and the fifth wheel.

17. An attachment for fifth wheel units of the class described having a locking jaw operating bar, comprising a lug adapted to be rigidly mounted on the operating bar, said lug having an opening therethrough, a lever having provision for rockably mounting the same beneath the fifth wheel, said lever including an arm extending loosely through the lug opening and having a recess forming an abutment shoulder adjacent the free end of the arm for latching engagement behind the lug when the operating bar is shifted to jaw opening position, and a second arm extending oppositely to the first-mentioned arm and provided with oppositely inclined cam surfaces adjacent its free end adapted to be projected into the path of movement of the king pin when the shoulder of the first-mentioned arm is in latching engagement behind the operating bar lug, whereby the cam arm will be depressed by the king pin and release the latch arm incident to relative movement between the king pin and the fifth wheel.

18. An attachment for fifth wheel units of the class described having a locking jaw operating bar, comprising a lug adapted to be rigidly mounted on the operating bar, said lug having an opening therethrough, a lever having provision for rockably mounting the same beneath the fifth wheel, said lever including an arm loosely extending through the lug opening and having a recess forming an abutment shoulder adjacent the free end of the arm for latching engagement behind the lug when the operating bar is shifted to jaw opening position, a second arm extending oppositely to the first-mentioned arm and provided with an inclined cam surface adjacent its free end adapted to be projected into the path of movement of the king pin when the shoulder of the first-mentioned arm is in latching engagement behind the operating bar lug, whereby the cam arm will be depressed by the king pin and release the latch arm incident to relative movement between the king pin and the fifth wheel, and means for manually tripping said lever independently of the king pin.

19. An attachment for fifth wheel units of the class described having a locking jaw operating bar, comprising a lug adapted to be rigidly mounted on the operating bar, said lug having an opening therethrough, a lever having provision for rockably mounting the same beneath the fifth wheel, said lever including an arm loosely extending through the lug opening and having a recess forming an abutment shoulder adjacent the free end of the arm for latching engagement behind the lug when the operating bar is shifted to jaw opening position, a second arm extending oppositely to the first-mentioned arm and provided with an inclined cam surface adjacent its free end adapted to be projected into the path of movement of the king pin when the shoulder of the first-mentioned arm is in latching engagement behind the operating bar lug, whereby the cam arm will be depressed by the king pin and release the latch arm incident to relative movement between the king pin and the fifth wheel, and means for manually operating said operating bar, said means including a cam lever having provision for pivotally mounting the same adjacent the outer extremity of the operating bar with the cam face thereof disposed for operative engagement with the peripheral edge of the fifth wheel, said last mentioned cam lever coacting with the aforementioned rockably mounted lever so that the former is automatically restored to a position in which the locking jaws are closed, incident to relative movement of the king pin respecting the locking jaws.

HARRY C. ROBB, Jr.